N. E. CHURCH.
ELECTROMAGNETIC BRAKE.
APPLICATION FILED MAR. 20, 1913.

1,101,997.

Patented June 30, 1914.
2 SHEETS—SHEET 1.

WITNESSES:
H. Smith
L. R. Fessenden.

INVENTOR.
Nathan Edmond Church
BY
his ATTORNEY.

N. E. CHURCH.
ELECTROMAGNETIC BRAKE.
APPLICATION FILED MAR. 20, 1913.

1,101,997.

Patented June 30, 1914.
2 SHEETS—SHEET 2.

WITNESSES:

INVENTOR.
Nathan Edmond Church
BY
ATTORNEY.

UNITED STATES PATENT OFFICE.

NATHAN EDMOND CHURCH, OF PITTSFIELD, MASSACHUSETTS.

ELECTROMAGNETIC BRAKE.

1,101,997. Specification of Letters Patent. Patented June 30, 1914.

Application filed March 20, 1913. Serial No. 755,774.

*To all whom it may concern:*

Be it known that I, NATHAN EDMOND CHURCH, a citizen of the United States, residing at Pittsfield, in the county of Berkshire and State of Massachusetts, have invented certain new and useful Improvements in Electromagnetic Brakes, of which the following is a specification.

My invention relates to electro-magnetic brake apparatus, and particularly concerns the provision of non-frictional means for reducing the speed of revoluble mechanical bodies, such as shafts and vehicle wheels, having a substantially fixed axis.

The invention essentially comprises a stationary portion having a series of magnetic poles annularly arranged thereon in spaced relation to each other, a rotary portion having a similar series of magnetic poles annularly arranged thereon in opposite relation to the poles on the stationary portion and maintained in mechanically free adjacent relation thereto, a field winding for connection with a source of direct electric current for generating a magnetic field or flux whose lines of force include each series of both rotary and stationary poles in their circuit, and suitable control means for regulating the amount of current flowing through the winding and, hence, for controlling the force of the magnetic field.

The principal objects of the invention are to improve the efficiency and durability of apparatus of a similar class.

I will proceed to describe a specific useful form of embodiment of my invention as applied to a specific object, namely to the carriage axle of a motor vehicle of any approved type, reference being had to the accompanying drawings, wherein—

Figure 1:
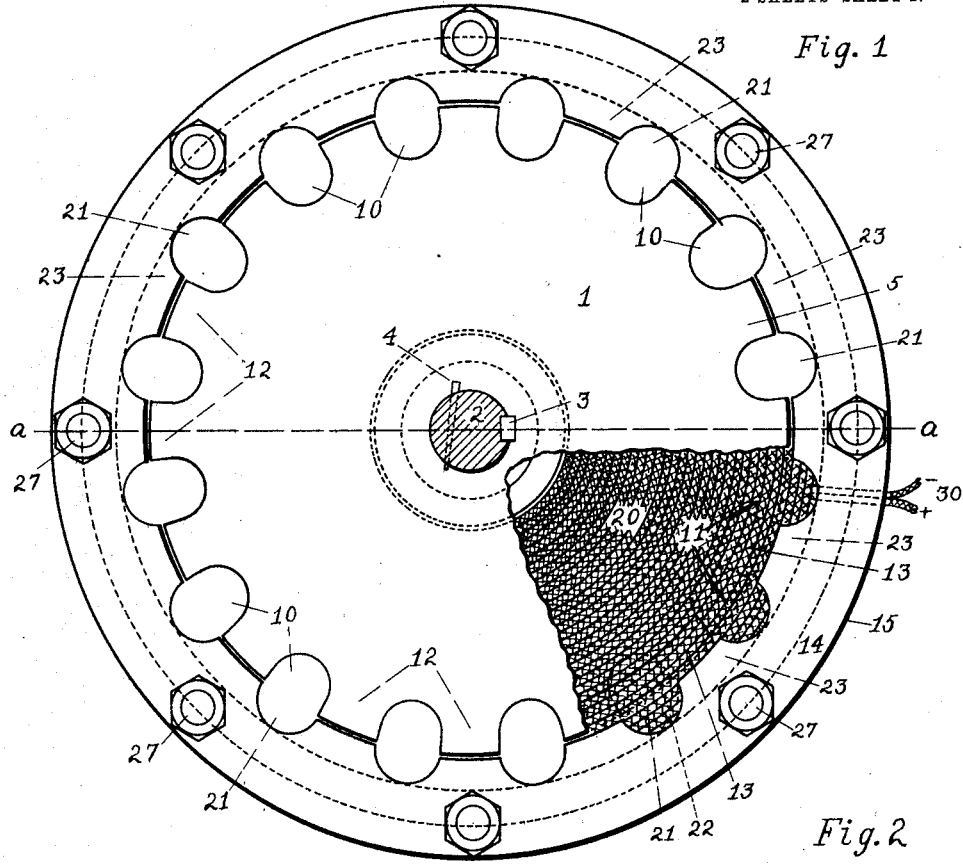
Figure 2:
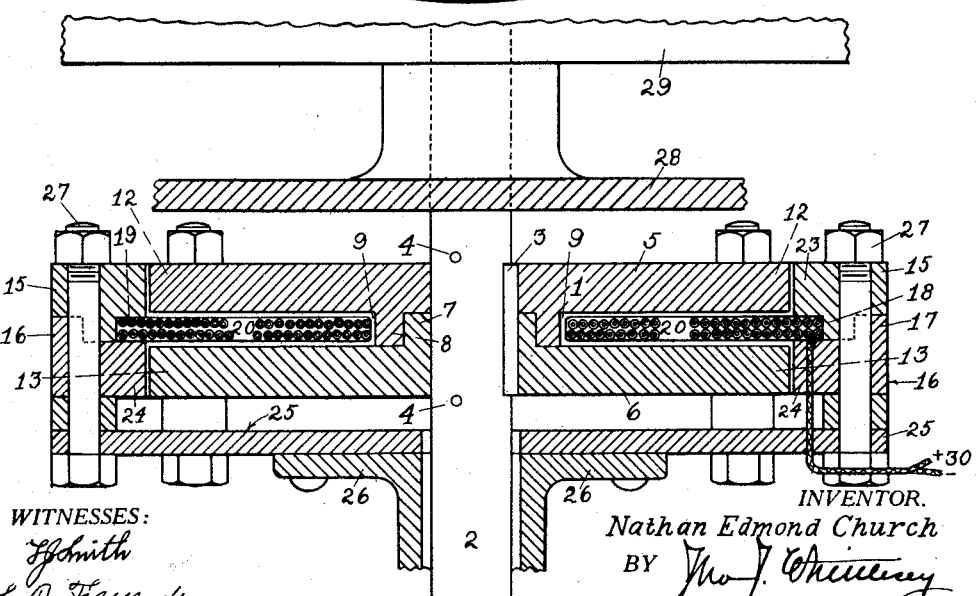
Figure 3:
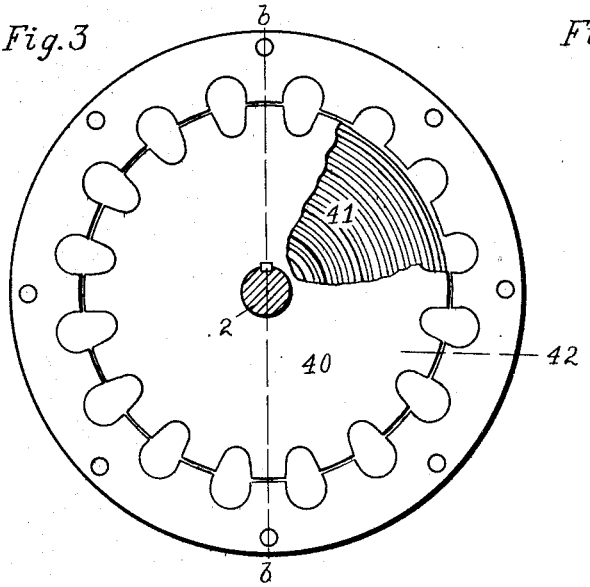
Figure 4:
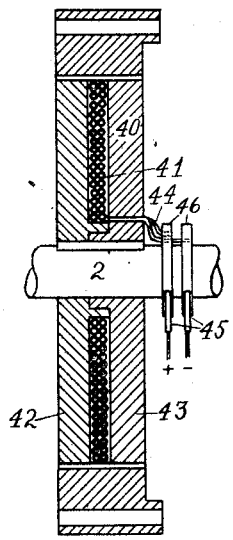
Figure 5:
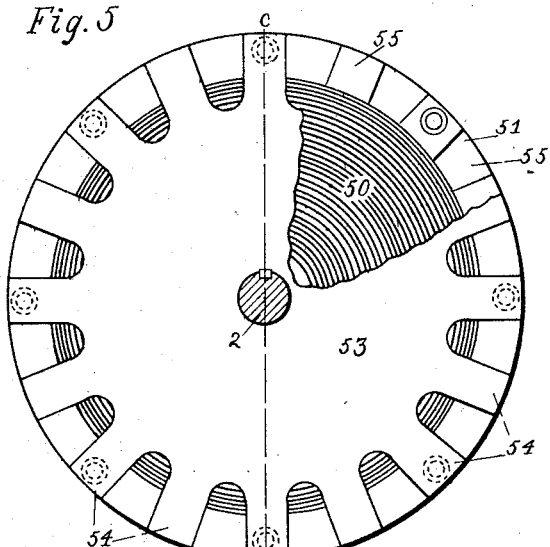
Figure 6:
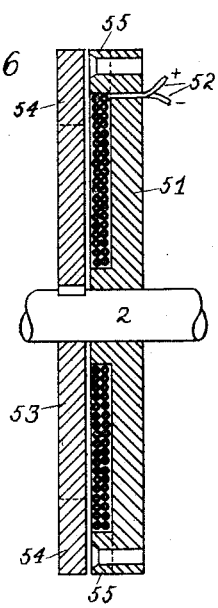
Figure 7:
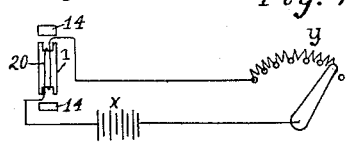

Figure 1 is a front elevation of the invention operatively mounted on the carriage axle; Fig. 2, a transverse sectional view of the same on the line $a—a$ of Fig. 1 and disclosing the vehicle wheel and axle housing partly cut away; Fig. 3, a front elevation of a modification wherein the field winding is mounted to rotate with the rotary magnetic portion; Fig. 4, a transverse sectional view of the same on the line $b—b$ of Fig. 3; Fig. 5, a front elevation of a further modification wherein the stationary magnetic portion is arranged in a plane lateral to that of the rotary portion, the field winding being mounted on the stationary portion; Fig. 6, a transverse sectional view of the same on the line $c—c$ of Fig. 5, and Fig. 7, a diagrammatic plan view of an electric braking system embodying my invention.

As shown in the preferred form of my device, the rotary magnetic portion 1 is mounted to move with the axle or shaft 2, being secured in fixed position thereon by a key 3, or other suitable means, preventing rotative movement on the shaft and by suitable stops 4, 4, preferably carried by the shaft and preventing lateral displacement of the said magnetic portion. The rotary portion 1 comprises separate radial sections 5, 6, arranged in spaced relation to each other and removably secured together at their inner margins preferably by the overlapping engaging flanges 7, 8, annularly formed on their opposing faces, the space intervening said section thus providing a recess 9 extending to their circumference and limited by their opposing faces and the outer axial flange 8. As shown, each of the radial sections 5, 6, is formed or provided with a series of marginal recesses or notches 10, 11, etc., distributed at equal intervals around their respective peripheries, the notches of one section being in substantial alinement with those of the other section, thus affording a double parallel series of polar members 12, 13, etc., for magnetic poles of unlike polarity. Freely surrounding the rotary portion 1 and in the same plane therewith, is shown a stationary magnetic portion 14, of annular formation and comprising separate planar sections 15, 16, removably secured together at their outer margins and preferably provided on their opposing faces with overlapping engaging flanges 17, 18, annularly formed thereon, the space intervening said sections forming a recess 19 of slightly less transverse dimension than the recess 9 of the rotary portion 1 and within which is seated in fixed position the field winding 20, which is constructed in the form of a disk, extending from the stationary portion 14 freely into the rotary portion 1 within the recess 9 provided therefor.

The inner margins of the sections 15, 16, of the stationary portion 14 are each provided, similarly to the rotary portion 1, with a series of transverse recesses 21, 22, etc., affording in like manner a double parallel series of alined pole members 23, 24, etc., which may be disposed exactly opposite the pole members 12, 13, of the corresponding series in the rotary portion 1 and of opposite polarity, thus affording conductors for the magnetic lines of force emanating from and returning to the rotary portion. The stationary magnetic portion 14 is shown as secured in removably fixed relation to the terminal plate 25, normally provided on the axle housing 26, by a series of bolts 27, etc., distributed around the outer margin of said portion and extending transversely through suitable openings provided therein and the plate 25, said bolts being also arranged to secure the sections 15, 16, of the stationary portion 14, in fixed relation.

My device may be disposed in that portion of the axle housing usually provided for inclosing the brake mechanism, said housing ordinarily including a shell 28 mounted to rotate with the vehicle wheel 29 and arranged to inclose the outer face and peripheral portion of the brake mechanism.

When operatively connected, suitable leads 30 from opposite poles of the winding 20 are drawn out laterally through one of the marginal recesses 22 of the stationary portion 14 and connected in any suitable manner with a source of direct-current energy, such as a battery $x$. Within the circuit thus established is introduced a rheostat $y$, or other suitable current resistance apparatus, with suitable control mechanism in connection therewith whereby the operator of the vehicle may regulate the amount of current flowing through the winding 20 and thus proportion the strength of the magnetic field of force to the speed of the vehicle when it is desired to retard the same.

The rotary and stationary portions of the device are constructed of magnetic metal, preferably of soft iron, which may be temporarily magnetized during the passage of a current through the winding and, upon cessation of the current, offers no magnetic resistance to the rotation of the vehicle wheel. Normally, therefore, all current is excluded from the winding.

It will be observed that the provision of the recesses 10, 11, 21, 22, etc., intervening the respective pole members 12, 13, 23, 24, etc., is necessary to accomplish the object of the device and forms one of the essential features of the invention. Without spaced pole members and the intervening air gaps to break the lines of force in the magnetic field and concentrate them in the pole members, the rotary portion of my device would be affected by the magnetism evenly at every point in its circumference and consequently no opposition would be offered to its free rotation during the passage of a current through the winding. In my present construction this opposition is designed to occur while the electric circuit is closed, whether the carriage axle is revolved in one direction or the reverse.

In the modification shown in Figs. 3 and 4, the rotary portion 40 is constructed similarly to the preferred form hereinbefore described, the winding 41 being disposed in a like manner intermediate the radial sections 42, 43, which are formed and secured on the shaft 2 as before described, leads 44 from opposite poles of the winding being drawn through a suitable opening provided transversely through one of the sections 42, 43, and electrically connected to separate collector rings 46 carried on the shaft and brushes 45. The distinctive feature of this modification is the winding 41 and its circuit connections which are mounted to move with the rotary portion 40.

In the further modification shown in Figs. 5 and 6, the winding 50 is mounted in stationary position in a suitable recess provided in the inner face of the stationary magnetic portion 51, suitable leads 52 from opposite poles of the winding being drawn through a suitable transverse opening provided in the body of the portion 51 and electrically connected to the source of current as explained in the preferred form of my device. The rotary magnetic portion 53 carried by the shaft or axle 2 is disposed laterally to the stationary portion 51, sufficient space intervening between the parts to allow the former to rotate freely. The distinctive feature of this form is the mounting of the rotary portion 53 in a plane parallel with but lateral to the plane of the stationary portion 51, while, furthermore, a single series only of pole members 54, 55, is provided on each of the portions 51, 53, respectively.

While I have referred to the current employed in connection with the field winding as a "direct" current, that being deemed the simplest and most practicable form, yet I do not wish to be understood as limiting the scope of my invention thereby, but include any source of current energy, whether it be direct or alternating, which is or may be adapted to the purpose.

I claim:—

1. In electro-magnetic brake apparatus, a stationary magnetic portion having a series of magnetic polar members annularly arranged thereon in spaced relation to each other, a rotary portion having its axis through the center of the stationary portion and provided with a series of magnetic polar members annularly arranged thereon in opposite relation to the polar members of the stationary portion, said rotary portion including separate radial members removably secured together in relatively spaced relation, a field winding carried by one of said magnetic portions and electrically connected to a source of current, said winding being concentric with the axis of the rotary portion and extended between the said radial members, and means for controlling the amount of current flowing through the winding.

2. In electro-magnetic brake apparatus, a rotary portion comprising separate radial parts removably secured together and arranged in relatively spaced relation, each of said parts having on its periphery a series of magnetic polar members arranged in spaced relation to each other, the polar members of one of said radial parts being in substantial alinement with the polar members of the other of said radial parts, a stationary portion arranged concentric to the axis of the radial portion and comprising separate rings laterally secured together in spaced relation, each of the rings having a series of magnetic polar members arranged at equal intervals around its inner margin, the polar members of each of said rings being arranged opposite the polar members provided on the corresponding part of the radial portion, and a field winding connected to a source of current and carried by the stationary portion and seated in the space between said rings, said winding being extended freely between the parts of the radial portion to a point near the axis thereof.

In testimony whereof I hereto affix my signature in presence of two witnesses.

NATHAN EDMOND CHURCH.

Witnesses:
JNO. J. WHITTLESEY,
WILLIAM E. BAGG.

Copies of this patent may be obtained for five cents each, by addressing the "Commissioner of Patents, Washington, D. C."